(No Model.)
J. G. ZIEGLER.
BICYCLE.
No. 527,135. Patented Oct. 9, 1894.
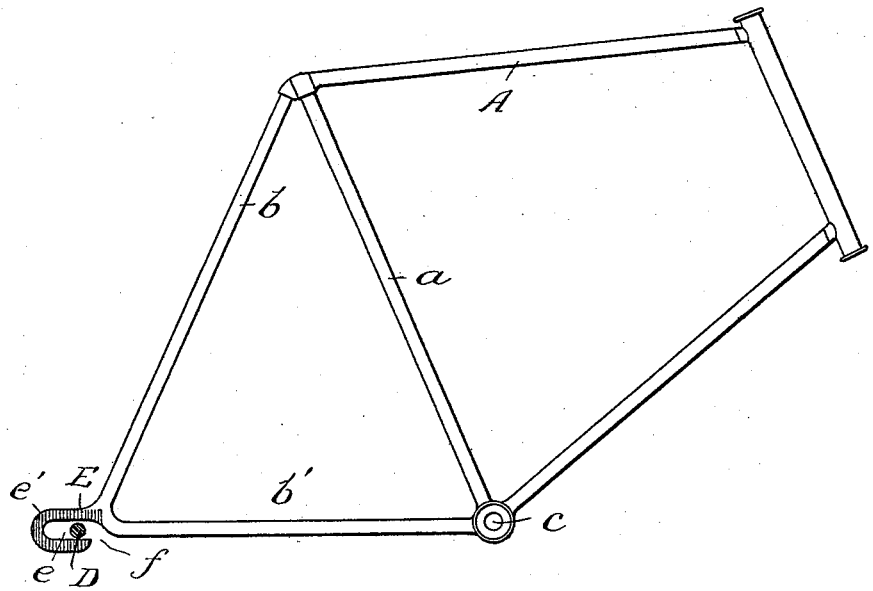
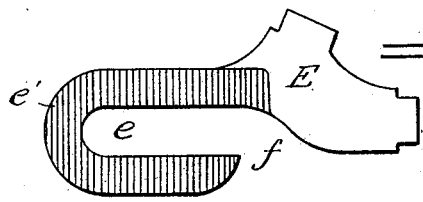
Witnesses
E. R. Kelly
David Levan
John G. Ziegler, Inventor
By Attorney

UNITED STATES PATENT OFFICE.

JOHN G. ZIEGLER, OF READING, PENNSYLVANIA, ASSIGNOR TO THE RELAY MANUFACTURING COMPANY, OF SAME PLACE.

BICYCLE.

SPECIFICATION forming part of Letters Patent No. 527,135, dated October 9, 1894.

Application filed October 16, 1893. Serial No. 488,226. (No model.)

*To all whom it may concern:*

Be it known that I, JOHN G. ZIEGLER, a citizen of the United States, residing at Reading, in the county of Berks, State of Pennsylvania, have invented certain Improvements in Bicycles, of which the following is a specification.

My invention relates particularly to safety bicycles in which the driving wheel is operated from a crank shaft connected with the wheel by a chain.

The use of pneumatic tires necessitates the comparatively frequent removal of the driving wheel to permit the convenient repairing of the same when punctured; and this renders it especially important that such removal should be readily effected. It is also important to provide for adjusting the position of the driving wheel with relation to the crank mechanism so as to take up the slack produced in the chain by wear. Heretofore it has been usual to provide a slot in the rear wheel fork of the frame for the reception of the axle and the position of the latter has been adjusted therein horizontally to take up the chain slack. These adjusting slots are commonly made open at the rear thus necessitating the parting of the chain before the wheel can be removed. A construction has been suggested in which the slot opens in the front, that is, toward the crank mechanism, but this opening is between the upper and lower arms of the fork and does not permit the convenient removal of the wheel.

My invention consists in providing a rear wheel fork with a slotted end which will permit the horizontal adjustment of the axle as heretofore and at the same time allow the convenient removal and replacing of the wheel without parting the chain. It is described in connection with the accompanying drawings which illustrate a bicycle frame embodying my improvements, and in which—

Figure 1 is a side view of a bicycle frame embodying my improvement. Fig. 2 is a detail view.

The frame A as shown is of the usual diamond shape, the upper and lower arms $b$ and $b'$ of the driving wheel fork extending rearward from the seat post $a$.

C is the bearing for the crank shaft and D represents in section the rear axle in its ordinary position in the slot $e$.

The converging arms $b$ and $b'$ are joined together preferably by means of a junction piece E which has a hook-shaped extension $e'$ forming the substantially horizontal axle slot $e$. This slot is closed at the rear by the bend of the hook and opens at $f$ under the lower fork arm $b'$ and toward the crank shaft, the said arm $b'$ joining the upper or shank portion of the piece E and leaving the point of the hook disconnected to form the opening $f$. The outer face of the hook shaped piece E is grooved or serrated as usual to prevent slipping of the washer by means of which the horizontal position of the axle D with reference to the crank mechanism is adjusted. By this improved construction the rider is enabled to remove and replace his wheel with the greatest ease and quickness it being merely necessary to loosen the washers on the axle D and then move the wheel toward the crank shaft until the axle passes through the openings $f$ on either side when it is entirely free from the frame. At the same time also the position of the axle may be adjusted horizontally as usual and the chain need in no case be parted.

What I claim is—

A bicycle having a frame with a rear fork and a crank mechanism forward thereof, said fork being formed with an axle adjusting slot $e$ opening at its forward end outside of the fork arms, substantially as and for the purpose set forth.

In testimony whereof I affix my signature in presence of two witnesses.

JOHN G. ZIEGLER.

Witnesses:
JOSEPH A. ALLGAIER,
JOSEPH H. ELLZ.